United States Patent Office 3,801,621
Patented Apr. 2, 1974

3,801,621
PROCESS FOR PREPARING UNSATURATED NITRILES BY CATALYTIC AMMOXIDATION OF SATURATED ALDEHYDES IN THE GAS PHASE
Guido Petrini and Luciano Moreschini, Milan, Franco Marciandi, Rho, and Franco Faletti, Milan, Italy, assignors to Montecatini Edison S.p.A., Milan, Italy
No Drawing. Filed Apr. 26, 1972, Ser. No. 247,619
Claims priority, application Italy, Apr. 29, 1971, 23,851/71; July 21, 1971, 7,515/71
Int. Cl. C07c *121/02, 121/30, 121/32*
U.S. Cl. 260—465.9                               10 Claims

ABSTRACT OF THE DISCLOSURE $\alpha$-$\beta$-Unsaturated nitriles are prepared by the gas phase reaction of one or more saturated $C_3$–$C_8$ aldehydes with molecular oxygen and ammonia in the presence of a catalyst containing antimony and uranium or iron at a temperature between about 300° and 600° C.

BACKGROUND OF THE INVENTION

(1) Field of the invention

The invention relates to a process for the preparation of unsaturated nitriles by the gas phase catalytic ammoxidation of a low molecular weight unsaturated aldehyde having 3 to 8 carbon atoms.

(2) Prior art $\alpha$-$\beta$-Unsaturated nitriles are generally prepared by reacting an olefin, ammonia and molecular oxygen in the gas phase, at high temperatures and in the presence of a suitable catalyst. Such a method is industrially utilized, for example, in producing acrylonitrile from propylene and methacrylonitrile from isobutene. The method is described in the existing patent literature.

It is also well known that $\alpha$-$\beta$-unsaturated nitriles can be obtained from the corresponding unsaturated aldehydes, for example, as described in British Pat. 709,337; Belgian Pat. 628,287; and Japanese Pat. 22,854/68.

$\alpha$-$\beta$-Unsaturated nitriles can also be obtained by dehydrogenation of the corresponding saturated nitriles at very high temperatures, on catalysts which are based on elements of Group I–B of the Periodic Table, or $CrO_3$ and/or $V_2O_5$. Other suitable catalysts in this process are Mo, W or $Al_2O_3$. This process is described in U.S. Pat. 2,554,484; German Pat. 1,127,890; and Japanese Pat. 2,967/69.

The production of saturated nitriles by ammoxidation of saturated aldehydes is also known. See, for example, U.S. Pat. 2,452,187; U.S. Pat. 2,525,818; and German Pat. 1,100,611.

In all the above prior art processes only a single conversion is effected. That is, either a double bond is introduced into saturated nitriles, or a CN-group is formed in an already unsaturated reactant.

It is, however, possible to obtain $\alpha$-$\beta$-unsaturated nitriles starting from saturated aldehydes in a single pass by means of heterogeneous catalysis using a catalyst which is capable of effecting both the dehydrogenation and the introduction of the nitrile group into the starting molecule. This is described in U.S. Pats. 2,412,437; 3,365,482; and 3,491,139, disclosing the use of catalysts based on chromium sesquioxide or Mo or W oxides on activated alumina, or catalysts based on elements of Group VIII of the Periodic Table, in the presence of co-catalysts based on metals, oxides, nitrates, halides, sulfates, or phosphates of elements of Group VI–B of the Periodic Table, and a promoter consisting of a halide, hydracid and halogenated hydrocarbon.

SUMMARY OF THE INVENTION

According to the present invention, it has now been found that, by using the catalysts hereinafter described, it is possible to ammoxidize saturated aldehydes in a highly selective way to form $\alpha$-$\beta$-unsaturated nitriles.

The present invention is a process for preparing $\alpha$-$\beta$-unsaturated nitriles by catalytically oxidizing one or more saturated aldehydes containing more than 2 carbon atoms, preferably 3 to 8 carbon atoms, with oxygen, or an oxygen-containing gas, in the presence of ammonia at a temperature between about 300° and 600° C., preferably between 400° and 500° C. The reaction is effected in the presence of a catalyst containing antimony, uranium or iron and oxygen. The aldehyde comprises between about 1% and 33%, preferably between 2% and 10%, by volume of the total reaction mixture. The molar ratio of oxygen to aldehyde is between 1/1 and 10/1, preferably between 1.2/1 and 4/1, while the molar ratio of ammonia to aldehyde is between 0.8/1 and 8/1, preferably between 1/1 and 6/1.

The contact time, defined as the ratio between the apparent catalyst volume and the volume of reactant gases fed per unit time under the reaction conditions stated above, is between 0.01 and 20 seconds, preferably from 0.1 to 5 seconds.

According to the present process, it is possible to utilize as starting aldehydes, with particularly satisfactory results, isobutyraldehyde, n-butyraldehyde, propionaldehyde and other aldehydes having not more than 8 carbon atoms, or mixtures thereof to obtain respectively methacrylonitrile, crotonitrile, acrylonitrile, and the other corresponding nitriles.

The catalysts employed in the process according to the present invention contain mixtures of antimony oxides and uranium or iron oxides, or more generally, compounds of Sb, U (or Fe) and oxygen, such that the atomic ratio between the Sb and U (or Fe) elements ranges from 0.3 to 40.

In the catalyst based on Sb and U the preferred atomic ratio of Sb to U is in the range of from 1 to 8, while in the catalyst based on Sb and Fe, the preferred atomic ratio of Sb to Fe is in the range of from 1 to 4.

In preparing the catalysts of the invention, various methods known in the art, and which are capable of producing mixtures of antimony oxides and uranium or iron oxides, or, more generally, compounds of Sb, U (or Fe) and oxygen wherein the atomic ratios are as defined above can be used.

The catalysts can be prepared, for example, by mixing antimony oxides and uranium or iron oxides and by subsequently subjecting the thus obtained mixtures to heat treatment, in an oxidizing medium. Alternatively, hydrated oxides of Sb and U (or Fe) can be precipitated from solutions of soluble compounds of these elements, such as the halides, nitrates, sulfates, etc., with a base (e.g., $NH_3$). The precipitates can then be separated, washed, dried and activated by heating at elevated temperatures.

Another method involves reacting the elements (Sb and U or Fe) with hot, concentrated nitric acid to form a reaction mixture which is then hydrolyzed with a base (for example, $NH_3$). The hydrolyzed mass is then filtered and the precipitate is washed, dried and activated at elevated temperatures for several hours.

Regardless of which method is used to prepare the catalyst, the activation temperature thereof is between 400° and 1,000° C., preferably between 600° and 900° C. In performing the present process, the catalyst may be employed either without a carrier or with a suitable carrier such as silica, alumina, silica-alumina, silicium carbide, pumice, etc.

The process can be effected in any type of reactor suitable for carrying out a reaction with heterogeneous catalysis and in the gas phase. Thus, it is possible to use both fixed bed reactors and fluidized bed reactors.

The reaction may be conducted either at atmospheric pressure or under pressures up to 4 atmospheres.

It is preferred to use air as the oxygen containing gas, although pure oxygen can be used.

The ammoxidation reaction is preferably conducted in the presence of at least one diluent such as nitrogen, steam, $CO_2$, etc.

DESCRIPTION OF THE PREFERRED EMBODIMENTS

The following examples are given to better illustrate the present invention, without however being a limitation thereof. In the examples, the catalysts were used in fixed bed reactors and the nitrile yields were determined by gas-chromatographic analyses.

Example 1

A vertical steel reactor of 120 mm. height having a 10 mm. inner diameter and provided with a terminal porous baffle and a thermocouple middle sheath was utilized in this, as well as the succeeding examples. The reactor was heated by immersion into an electrically heated fluidized sand bed. The reagent aldehyde, in this example, isobutyraldehyde, was vaporized in a nitrogen stream, the flow of which had been adjusted by means of a flowmeter, before being fed to the reactor. Oxygen and ammonia were introduced into the reactor in amounts which were regulated by flowmeters, and these gases were mixed with the $N_2$ stream carrying the aldehyde in a reaction zone near the catalyst. The reaction product was conveyed to a valve for gas-chromatographic sampling in the gas phase. A sample was injected from the valve into a gas-chromatograph when the reaction conditions were stabilized at the desired values as reported below.

The catalyst was prepared by adding, under stirring, 145.8 g. of antimony oxide ($Sb_2O_3$) to 101 g. of ferric nitrate [$Fe(NO_3)_3 \cdot 9H_2O$] dissolved in 100 ml. of boiling water. The thus obtained paste was evaporated to dryness and then further dried for 12 hours at 150° C. The thus formed solid was activated for 16 hours at 750° C. and subsequently for 24 hours at 850° C. in air.

2.5 cc. of the catalyst obtained as described hereinabove, having a 100–150 mesh particle size, were charged into the reactor, the temperature of which was adjusted to 460° C. The contact time in the reactor was 1 minute and the molar ratios of the feed gases were as follows: isobutyraldehyde/$NH_3$/air/$N_2$=1/3/20/22.

From the analysis of the products it was determined that the methacrylonitrile yield was 35.2%. The yield was calculated according to the following ratio:

$$\frac{\text{g. of C obtained as methacrylonitrile} \times 100}{\text{g. of C fed as isobutyraldehyde}}$$

Example 2

The same method and apparatus as described in Example 1 were used in this example. The reactor was charged with 2.5 cc. of a catalyst having a 100–150 mesh particle size. The catalyst was obtained by dissolving 194.2 g. of $SbCl_5$ and 87.8 g. of $FeCl_3 \cdot 6H_2O$ in 3,600 ml. of $H_2O$. To this solution a 32% $NH_3$ solution was gradually added, under continuous stirring, until a pH of 5.5 was reached.

The thus obtained precipitate was recovered by filtration and subsequently dried at 150° C. for 12 hours. The thus formed solid was calcined in air for 16 hours at 650° C., then for 16 hours at 750° C. and finally for 24 hours at 850° C.

After charging the reactor with the catalyst, the temperature was adjusted to 440° C., and the reactant gases, in the following molar ratios were fed to the reactor: isobutyraldehyde/$NH_3$/air/$N_2$=1/4/20/22. The contact time in the reactor was 0.4 second. The methacrylonitrile yield determined by analysis of the products was 44.1%.

Example 3

The reactor was charged with 2.5 cc. of the catalyst of Example 2 and, operating according to the same technique as described in Example 1, the temperature was adjusted to 420° C. The reactant gases were fed to the reactor in the following molar ratios: isobutyraldehyde/$NH_3$/air/$N_2$=1/2/20/22. The contact time in the reactor was 0.4 second. The methacrylonitrile yield was 43.4%.

Example 4

The procedure and apparatus were the same as described in Example 1. The reactor was charged with 2.5 cc. of a catalyst having a 100–150 mesh particle size. The catalyst was prepared by dissolving 257 g. of antimony chloride ($SbCl_3$) in 130 ml. of 1:1-HCl (one volume of 35% HCl and one volume of $H_2O$). Microspheroidal silica (200 g.) of a commercially available type, having a pore volume of 1.1 cc./g. was impregnated with the above solution. The impregnated material was allowed to stand for 1 hour, after which it was dried at 50° C. for 2 hours under continuous stirring and subsequently poured into a vigorously stirred alkaline solution, consisting of 300 ml. of a 32% $NH_3$ solution and 2,400 ml. of water. After 10 minutes of stirring, the precipitate was recovered by filtration and dried at 150° C. for 12 hours. The solid residue was washed with 9 l. of a 3% $NH_3$ solution, subsequently dried at 150° C. for 12 hours and then impregnated, in the cold with a 200 ml. aqueous solution containing 182 g. of ferric nitrate [$Fe(NO_3)_3 \cdot 9H_2O$]. The solid was allowed to stand for 4 hours, after which it was dried under continuous stirring until the nitrous vapors disappeared. The solid was further dried at 150° C. for 12 hours, after which it was activated in air for 16 hours at 650° C., for 16 hours at 750° C. and for 24 hours at 850° C.

After charging the catalyst into the reactor, the temperature was adjusted to 439° C., and the reactant gases were fed into the reactor in the following molar ratios: isobutyraldehyde/$NH_3$/air/$N_2$=1/2/20/22. The contact time in the reactor was 0.75 second. The methacrylonitrile yield determined by analysis of the products was 52.0%. From such analysis it further appeared that the percent distribution of the liquid organic reaction products was as follows:

| | Percent |
|---|---|
| Methacrolein | 2 |
| Acrylonitrile | 8 |
| Methacrylonitrile | 86 |
| Acetonitrile | 4 |

Isobutyraldehyde and acetone were present in small amounts.

Example 5

The procedure and apparatus were the same as described in Example 1. The reactor was charged with 2.5 cc. of the catalyst described in Example 4. The temperature of the reactor was adjusted to 450° C. The reactant gases were fed to the reactor in the following molar ratios: isobutyraldehyde/$H_2O$/$NH_3$/air/$N_2$=1/1/3/20/22. The contact time in the reactor was 0.75 second. The yield of methacrylonitrile was 38.3%.

Example 6

The procedure and apparatus were the same as described in Example 1. The reactor was charged with 2.5 cc. of the catalyst described in Example 4. The temperature in the reactor was adjusted to 447° C., and the reactant gases were fed therein in the following molar ratios: isobutyraldehyde/$H_2O$/$NH_3$/air/$N_2$=1/3/3/20/22. The contact time was 0.4 second. The yield of methacrylonitrile was 38.6%.

Example 7

The procedure and apparatus used in this example were the same as described in Example 1. The reactor was charged with 2.5 cc. of a catalyst having a 100–150 mesh particle size, prepared in the same way as the catalyst described in Example 4, with the exception that the carrier employed in this example was microspheroidal aluminum oxide previously calcined at 700° C. and having a pore volume of 1.5 cc./g.

The temperature in the reactor was adjusted to 400° C. and the contact time was 0.75 second. The reactant gases were fed into the reactor in the following molar ratios: isobutyraldehyde/$NH_3$/air/$N_2$=1/2/20/22. An analysis of the reaction product revealed that the percent distribution of the liquid organic products was as follows:

|  | Percent |
|---|---|
| Methacrolein | 4 |
| Acetone | 2 |
| Acrylonitrile | 3 |
| Methacrylonitrile | 69 |
| Acetonitrile | 21 |

Isobutyraldehyde and isobtuyronitrile were present in small amounts.

Example 8

The procedure and apparatus in this example were the same as described in Example 1. The catalyst was prepared by dissolving 39.2 g. of uranyl nitrate $$[UO_2(NO_3)_2 \cdot 6H_2O]$$

in 60 ml. of water and 20 ml. of 35% hydrochloric acid, to which were gradually admixed, under stirring, 140 g. of antimony pentachloride. Thereafter, 200 ml. of a 32% ammonia solution diluted with 400 ml. of water were very slowly poured into the solution. After filtration, the precipitate was washed with 1 l. of cold water and then dried for 12 hours at 760° C. After charging the reactor with 2.5 cc. of the above catalyst having 100–150 mesh particle size, the temperature in the reactor was adjusted to 480° C. The reactant gases were fed into the reactor in the following molar ratios:

isobutyraldehyde/$NH_3$/air/$N_2$=1/3/20/22

The contact time was 0.4 second. The yield of methacrylonitrile was 27.7%.

Example 9

The procedure and apparatus in this example were the same as described in Example 1. The reactor was charged with 2.5 cc. of the catalyst described in Example 8.

The temperature in the reactor was adjusted to 455° C. for a contact time of 0.4 second. The reactant gases were fed into the reactor in the following molar ratios: isobutyraldehyde/$H_2O$/$NH_3$/air/$N_2$=1/1/3/20/22. The methacrylonitrile yield was 25.9%.

Example 10

The procedure and apparatus in this example were the same as described in Example 1. The reactor was charged with 2.5 cc. of the catalyst described in Example 8. The temperature in the reactor was adjusted to 450° C., for a contact time of 0.75 second. The reactant gases were fed into the reactor in the following molar ratios: isobutyraldehyde/$H_2O$/$NH_3$/air/$N_2$=1/3/2/20/22.

The percent distribution of the liquid organic reaction products was as follows:

|  | Percent |
|---|---|
| Methacrolein | 2.0 |
| Acetone | 2.5 |
| Acrylonitrile | 3.5 |
| Methacrylonitrile | 73.5 |
| Acetonitrile | 18.5 |

Isobutyraldehyde and isobutyronitrile were present in small amounts.

Example 11

The procedure and apparatus in this example were the same as described in Example 1. The reactor was charged with 2.5 cc. of a catalyst having 100–150 mesh particle size. The catalyst was prepared by gradually admixing, under vigorous stirring, 10 ml. of 35% HCl, 10 ml. of water and 10.2 g. of uranyl acetate [$UO_2(C_2H_3O_2)_2$] with 50 g. of $SbCl_5$.

When the catalyst components were dissolved, the solution was cooled to room temperature, and 35.3 g. of microspheroidal silica of the type described above were impregnated with the solution. The thus obtained solid was dried for 1 hour at 100° C. and then treated with a solution consisting of 100 ml. of water and of 14 ml. of 32% ammonia. After filtration, the solid was washed until no more ammonium ion was present in the wash waters. The solid material was then dried for 12 hours at 110° C. The residue was then activated for 12 hours at 760° C. in an air stream.

The temperature in the reactor was adjusted to 460° C., for a contact time of 0.2 second, and the reactant gases were then fed into the reactor in the following molar ratios: isobutyraldehyde/$NH_3$/air/$N_2$=1/2/20/22. The methacrylonitrile yield was 25.5%.

Example 12

Using the same procedure and apparatus as described in Example 1, 2.5 cc. of the catalyst described in Example 11 were charged into the reactor. The reactor temperature was adjusted to 440° C., for a contact time of 0.4 second. The reactant gases were fed into the reactor in the following molar ratios: isobutyraldehyde/$NH_3$/air/$N_2$=1/2/20/22. The yield of methacrylonitrile was 23.1%.

Example 13

The procedure and apparatus in this example were the same as described in Example 1. The reactor was charged with 2.5 cc. of a catalyst having a 100–150 mesh particle size, prepared by dissolving 35 g. of uranyl nitrate [$UO_2(NO_3)_2 \cdot 6H_2O$] in 90 ml. of water and 10 ml. of 35% HCl, by gradualdly admixing, under stirring, 62.6 g. of antimony pentachloride and, finally, by pouring 105 ml. of 32% ammonia diluted with 200 ml. of water very slowly into this solution. After filtration, the obtained precipitate was washed with 1 l. of cold water and then dried for 12 hours at 150° C. The thus obtained material was activated in air for 12 hours at 430° C. and subsequently for 12 hours at 600° C.

The temperature of the reactor was adjusted to 460° C. The reactant gases were introduced into the reactor in the following molar ratios: isobutyraldehyde/$NH_3$/air/$N_2$=1/2/20/22. The contact time was 0.75 second. The methacrylonitrile yield was 37.7%.

Example 14

Using the procedure and apparatus for Example 1, 2.5 cc. of the catalyst described in Example 13 where charged to the reactor. The reactor temperature was adjusted to 480° C., and the reactant gases were introduced into the reactor in the following molar ratios: isobutyraldehyde/$NH_3$/air/$N_2$=1/4/20/22. The contact time was 0.4 second. The methacrylonitrile yield was 42.5%.

Variations and modifications can, of course, be made without departing from the spirit and scope of the present invention.

Having thus described our invention, what we desire to secure by Letters Patent and hereby claim is:

1. A process for preparing an α-β-unsaturated nitrile comprising reacting a saturated aldehyde selected from the group consisting of propionaldehyde, isobutyraldehyde and n-butyraldehyde in the gas phase, at a temperature between about 300° and 600° C., with molecular oxygen and ammonia, wherein the molar ratio of oxygen to aldehyde is between 1 and 10 and the molar ratio of ammonia to aldehyde is between about 0.8 and 8; said reaction being effected in the presence of a catalyst consisting essentially of a mixture of antimony oxide and uranium oxide or antimony oxide and iron oxide, wherein the atomic ratio of antimony to uranium or iron is between about 0.3 and 40 to obtain, respectively, and α,β-unsaturated nitrile selected from the group consisting of acrylonitrile, methacrylonitrile and crotonitrile.

2. A process as claimed in claim 1 wherein the catalyst is supported on a carrier selected from the group consisting of silica, alumina, silica-alumina, silicium carbide and pumice.

3. A process as claimed in claim 1 wherein the α-β-unsaturated nitrile is methacrylonitrile and the aldehyde is isobutyronitrile.

4. A process as claimed in claim 2 wherein the α-β-unsaturated nitrile is methacrylonitrile and the aldehyde is isobutyraldehyde.

5. A process as claimed in claim 1 wherein the gas phase reaction mixture is diluted with nitrogen, steam or carbon dioxide.

6. A process as claimed in claim 2 wherein the gas phase reaction mixture is diluted with nitrogen, steam or carbon dioxide.

7. A process as claimed in claim 3 wherein the gas phase reaction mixture is diluted with nitrogen, steam or carbon dioxide.

8. A process as claimed in claim 1 wherein the aldehyde comprises from about 2 to 10% by volume of the gas phase reaction mixture.

9. A process as claimed in claim 1 wherein the reaction temperature is between about 400° and 500° C.

10. A process as claimed in claim 1 wherein the molar ratio of oxygen to aldehyde is between about 1.2 and 4 and the molar ratio of ammonia to aldehyde is between about 1 and 6.

References Cited

UNITED STATES PATENTS

| | | | |
|---|---|---|---|
| 3,365,482 | 1/1968 | Khoobiar | 260—465.9 X |
| 3,491,139 | 1/1970 | Biale | 260—465.9 |
| 2,412,437 | 12/1946 | Wagner | 260—465.9 |
| 3,179,694 | 4/1965 | Van Eygen | 260—465.9 |
| 3,197,419 | 7/1965 | Callahan et al. | 260—465.3 X |
| 3,308,151 | 3/1967 | Callahan et al. | 260—465.3 |
| 3,686,267 | 8/1972 | Taylor | 260—465.3 |

JOSEPH P. BRUST, Primary Examiner

U.S. Cl. X.R.

260—465.1, 593 R, 601 R

UNITED STATES PATENT OFFICE
CERTIFICATE OF CORRECTION

Patent No. 3,801,621　　　　Dated April 2, 1974

Inventor(s) Guido Petrini et al

It is certified that error appears in the above-identified patent and that said Letters Patent are hereby corrected as shown below:

Column 1, line 10: "23,851/71; July 21, 1971, 7,515/71" should read -- 23,851 A/71; July 21, 1971, 7,515 A/71 --.

Column 3, line 26: "thermocouple" should read -- thermo-couple --.

Column 5, line 13: "was microspheroidal" should read -- was a microspheroidal --. Column 5, line 31: "isobtuyronitrile should read -- isobutyronitrile --.

Column 6, line 52: "gradualdly" should read -- gradually --
Column 6, line 68: "for" should read -- of --. Column 6, line 69: "where" should read -- were --.

Column 7, line 18: "and" , second occurrence, should read
-- an --.

Signed and sealed this 24th day of September 1974.

(SEAL)
Attest:

McCOY M. GIBSON JR.
Attesting Officer

C. MARSHALL DANN
Commissioner of Patents